United States Patent [19]

Naito

[11] 4,283,027
[45] Aug. 11, 1981

[54] TAPE FEEDER IN A TAPE RECORDER

[75] Inventor: Kyohei Naito, Tokyo, Japan

[73] Assignee: Shinwa Kabushiki Kaisha, Tokyo, Japan

[21] Appl. No.: 135,218

[22] Filed: Mar. 31, 1980

[30] Foreign Application Priority Data

Apr. 3, 1979 [JP] Japan .............................. 54/43676[U]

[51] Int. Cl.³ .......................... G03B 1/04; G11B 15/32
[52] U.S. Cl. .................................... 242/208; 242/209; 226/188
[58] Field of Search ......................... 242/200, 201–204, 242/208–210; 360/74, 96; 226/181, 188, 190

[56] References Cited

U.S. PATENT DOCUMENTS 3,900,174 8/1975 Morimoto et al. ..................... 242/209
3,930,268 12/1975 Uemura .................................. 360/96

*Primary Examiner*—Leonard D. Christian
*Attorney, Agent, or Firm*—James E. Nilles

[57] ABSTRACT

A tape feeder in a tape recorder comprising, a pair of reel support drive gears mounted on a pair of reel supports, a pair of tape winding gears capable of being brought into or out of mesh with the corresponding reel support drive gears, a pair of capstans driven by a motor for rotating the corresponding tape winding gears, a pair of pinch rollers connected to a head base plate and capable of being brought into and out of pressing engagement with the corresponding capstans, a pair of reverse action members rotatably supported on the corresponding capstan bearing, a pair of springs provided to the corresponding reverse action members, said springs being adapted to press the pinch roller against the capstan when the head base plate advances and at the same time urge the tape winding gear to mesh with the reel support drive gear, and a slider member slidably provided between the pair of reverse action members.

1 Claim, 3 Drawing Figures

TAPE FEEDER IN A TAPE RECORDER

BACKGROUND OF THE INVENTION

1. Field of the Invention:

This invention relates to a tape feeder in a tape recorder.

2. Description of the Prior Art:

In the conventional tape feeder of the tape recorder, the tape is fed in the following manner: one of two tape winding gears driven by the motor is brought into mesh with the corresponding reel support drive gear for driving the reel and at the same time the associated pinch roller is brought into pressing contact with the corresponding capstan while leaving the other pinch roller released, so that the tape is held between and fed by the pinch roller and the capstan. Conventionally, separate actuating mechanisms are provided for actuating the pinch roller and the tape winding gear. This makes the construction of the tape feeder complex and gives rise to the problems that the timing of actuating the pinch roller does not coincide with the timing of actuating the tape winding gear.

SUMMARY OF THE INVENTION

An object of this invention is to provide a tape feeder in the tape recorder which can overcome the drawbacks of the conventional device and in which the pinch roller and the tape winding gear are simultaneously actuated by a single reverse action member rotatably mounted on the capstan bearing so that the simultaneous actuation of these two members can be effected with a simple construction.

To achieve the above objective, the tape feeder of this invention consists mainly of: a pair of reverse action members each rotatably mounted on a capstan bearing, said reverse action member having a tape winding gear rotatably supported at one end thereof and having a cam groove formed at the other end thereof, said tape winding gear being brought into or out of engagement with a reel support drive gear, said cam groove being adapted for receiving the pinch roller shaft to bring the pinch roller into or out of pressing contact with the capstan; a pair of springs for urging the reverse action member so that as the head base plate advances, the reverse action member brings the pinch roller into pressing engagement with the capstan and at the same time brings the tape winding gear into mesh with the reel support drive gear; and a slider member slidably provided between the pair of reverse action members, said slider member being adapted to slide, when the tape winding is completed, toward the reverse action member on that side where the tape has been wound so that the slider member pushes one end of that reverse action member and at the same time releases the other reverse action member.

With this invention, the pinch roller and the tape winding gear can simultaneously be actuated by a single reverse action member rotatably supported on the capstan bearing; in other words there can be no difference in timing for actuating the pinch roller and the tape winding gear. Furthermore, since the simultaneous actuation of the pinch roller and the tape winding gear can be effected simply by pushing one end of the reverse action member, it is possible to simplify the construction and reduce cost.

DETAILED DESCRIPTION OF THE PREFERRED EMBODIMENT

Figure 1:
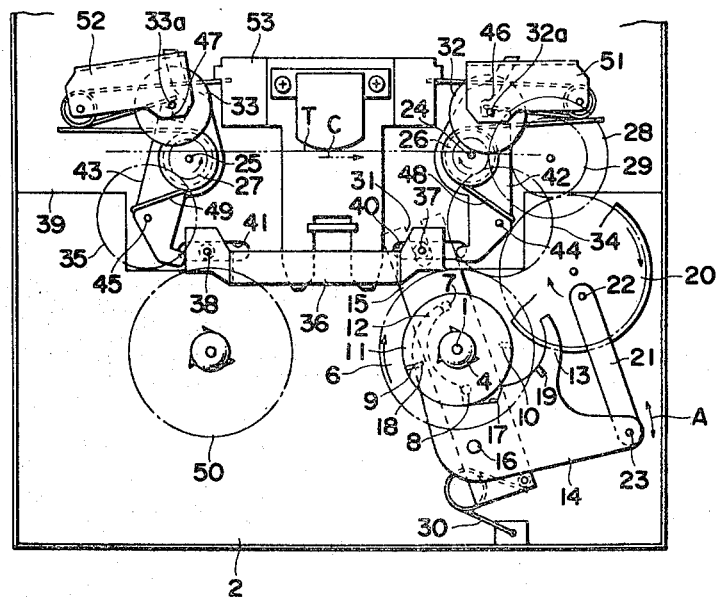
FIG. 1 is a partially cutaway plan view of an embodiment of this invention.
Figure 2:
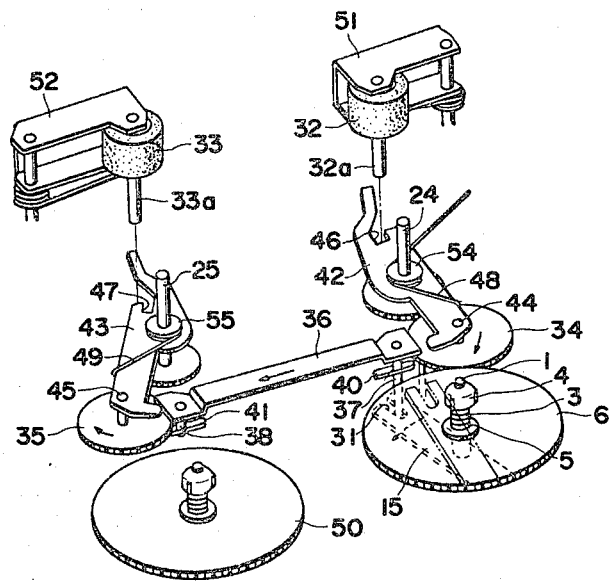
FIG. 2 is a perspective view of a disassembled reverse action member.

Reference numeral 1 represents one of a pair of reel shafts projecting upwardly from a chassis 2 and on which is rotatably mounted a reel support 3, on the top of which is fixed a reel mount 4 for engagement with a cassette reel. Interposed between the reel mount 4 and a reel support drive gear 6 is a spring 5 which presses the gear 6 against the reel support 3 so that the reel support rotates with the gear.

Under the reel support drive gear 6, a detection disk 11 is pressed with a small pressure against the reel support 3 so as to be rotatable with it. Protruding downwardly from the undersurface of the detection disk 11 are a pair of position setting projections 7, 8 and a pair of engagement projections 9, 10. Disposed under the detection disk 11 is an actuator 14 which is rotatably mounted on a movable shaft 16 projecting from a reversing lever 15 which will be described later. At one end the actuator 14 has a pair of arms 12, 13 curved toward each other. Midway between the pair of arms 12, 13 the actuator 14 has a recess 17 for receiving one of the position setting projections 8 to restrict the rotation of the detection disk. The arms 12, 13 have a pair of upwardly protruding engagement projections 18, 19 on the upper surface thereof. The other end of the actuator 14 is connected through a connecting arm 21 and shafts 22, 23 to a drive gear 20 driven by the motor not shown whereby the actuator is reciprocally oscillated as shown by the arrow B in FIG. 3 as the drive gear 20 rotates.

Designated by 24, 25 are capstans with pinions 26, 27 secured at the lower portion thereof and which are driven by the motor through a belt transmission mechanism. As the motor rotates, the capstan 24 on the right-hand side is driven to rotate clockwise and the other capstan 25, counterclockwise. The rotation of the capstan 24 on the right-hand side is transmitted reduced to the drive gear 20, which is in mesh with the gear 29 rigidly connected with the gear 28 which in turn meshes with the pinion 26 on the right-hand side capstan 24.

At one end where the movable shaft 16 is attached, the reversing lever 15 has a spring 30 which is connected at one end with the chassis 2 and at the other end with the reversing lever 15 so that the reversing lever 15 is rotatable about the reel shaft 1 by the snap action of the spring 30. The reversing lever 15 also has a notch 31 formed at the other end into which is fitted at shaft 37 which in turn is connected with one end of a sliding arm 36. The sliding arm 36 makes up a reversing mechanism which actuates pinch rollers 32, 34 and tape winding gears 34, 35.

A pair of shafts 37, 38 fitted at the ends of the sliding arm 36 are received in a pair of guide slots 40, 41 formed in a subchassis 39 so that the shafts can be slide along the slots. Since the shaft 37 is engaged with the reversing lever 15, it is slid along the slot as the lever 15 is turned.

A pair of reversing members 42, 43 making up the reversing mechanism are rotatable about the capstan bearings 54, 55 on both sides of the sliding arm 36. At one end of the reversing members 42, 43, the tape winding gears 34, 35 in mesh with the pinions 26, 27 are rotatably supported on shafts 44, 45. Cam grooves 46, 47 are formed at the other end of the reversing members 42, 43 to receive shafts 32a, 33a of the pinch rollers 32, 33. The sliding action of the sliding arm 36 and the turning action of the reversing members 42, 43 with the aid of springs 48, 49 cause the tape winding gears 34, 35 to engage with or disengage from the reel support drive gears 6, 50 and at the same time bring the pinch rollers 32, 33 into and out of pressing contact with the capstans 24, 25, thus reversing the tape winding direction.

The pinch rollers 32, 33 have their shafts 32a, 33a rotatably supported on the front end of roller supports 51, 52 which in turn are pivotably mounted at their lower ends on the subchassis 39. Each of the roller supports 51, 52 is resiliently connected to a head base plate 53 so that the pinch rollers 32, 33 move back and forth with the head base plate 53.

The action of this embodiment will now be explained in the following. When the slider arm 36 is slid to the left-hand side position, it pushes one end of the reverse action member 43 to rotate it against the force of the spring 49 so that the winding gear 35 and the pinch roller 33 are brought out of contact with the reel support drive gear 50 and the capstan 25 respectively. At this time, since the reverse action member 42 on the right-hand side is free from the action of the slider arm 36, the spring 48 keeps the tape winding gear 34 in mesh with the reel support drive gear 6, and the pinch roller 32 on the right-hand side in pressing contact with the capstan 24. Thus, the tape T is held and guided between the pinch roller 32 and the capstan 24 and is fed in the direction of the arrow C in FIG. 1 from the left-hand side reel to the right-hand side reel on which it is to be wound up. In this condition, the reversing lever 15 assumes the position as indicated by the double-dot line in FIG. 3. While the motor is running, the actuator 14 linked with the drive gear 20 performs an alternating pivotal movement about the movable shaft 16 as the drive gear 20 rotates. At this time, the engagement projection 18 of the actuator 14 is so situated as to be engageable with the corresponding engagement projection 9 of the detection disk 11. But when the tape T is being fed, the reel support 3 rotates clockwise with the reel, causing the detection disk 11 to turn clockwise so that a pair of projections 18, 19 of the actuator 14 do not engage with the projections 9, 10, with the result that the actuator 14 performs an alternating pivotal movement over the predetermined range without actuating the reversing lever 15.

When the tape T has been wound up, the reel and the reel support 3 stop rotating and at the same time the detection disk 11 mounted on the reel support 3 also stops rotating. Then, as the actuator 14 is pivoted in one direction, the position setting projections 7, 8 of the detection disk 11 are pushed by the one of the push portions and one edge of the recess 17 of the actuator 14 until the detection plate 11 is moved to a predetermined position. Then, as the actuator 14 is pivoted in the opposite direction, the engagement projection 18 approaches the projection 9 of the detection disk 11 until it engages with and slide along the guide slope of the projection 9. The engagement projection 18 pushes up the detection disk 11 as it slides under the guide slope and moves past it. When the actuator 14 is pivoted in the first direction again, the projection 18 moves back as it came, and abuts against the vertical engagement surface of the projection 9 on the detection disk 11. This prevents a further movement of the actuator 14 about the shaft 16 although the rotation of the drive gear 20 tends to turn the actuator in the same direction or clockwise. As a result, the rotating force of the drive gear 20 now acts on the reversing lever 15. That is, the actuator 14 moves clockwise about the engagement point between its projection 18 and the projection 9 of the detection disk 11 so that the shaft 16 also moves about that engagement point. This causes the reversing lever 15 to turn clockwise about the reel shaft 1 and, by the action of the spring 30, snap into the position indicated by the double-dot line in FIG. 3, with the result that the sliding arm 36 connected with the other end of the reversing lever 15 is slid toward the right-hand side as viewed in FIG. 1. This causes the reversing member 42 on the right-hand side to move against the force of the spring 48, disengaging the tape winding gear 34 and the pinch roller 32 from the reel support drive gear 6 and the capstan 24 respectively. At the same time, the movement of the sliding arm 36 toward the right allows the reversing member 43 on the left-hand side to return to the working position by the action of the spring 49, thus bringing the tape winding gear 35 into mesh with the reel support drive gear 50 and pressing the pinch roller 33 against the capstan 25. As a result, the tape feeding direction is reversed.

Figure 3:
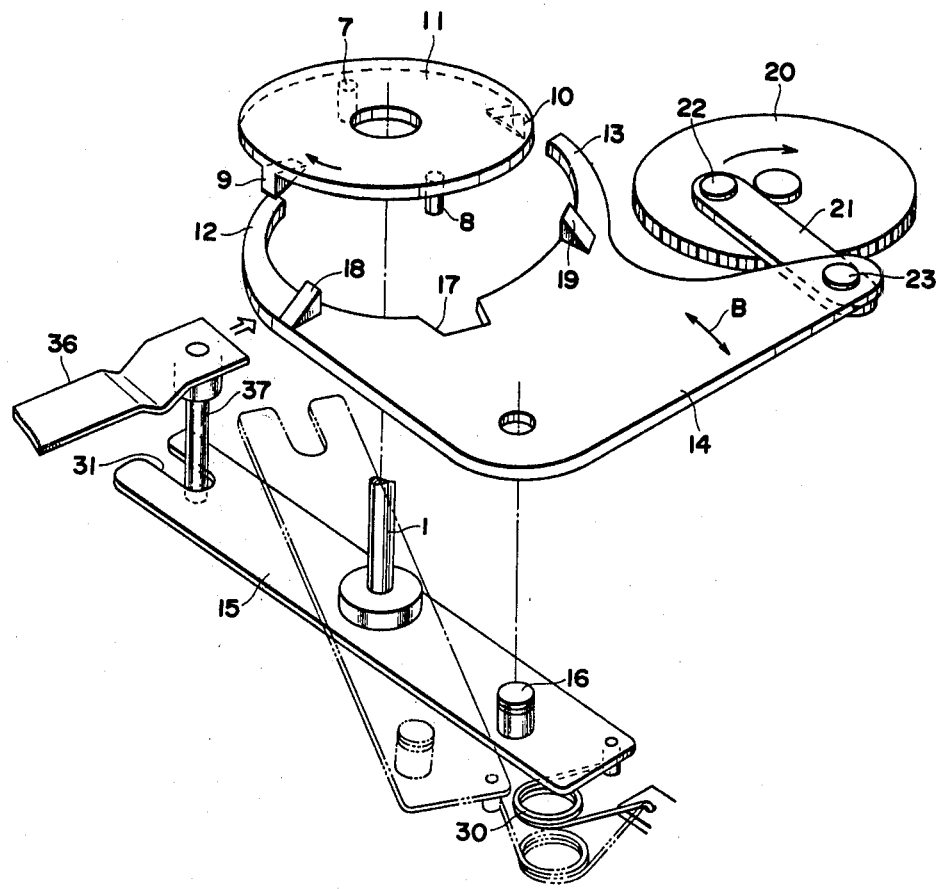
FIG. 3 is a perspective view of a disassembled actuator portion.

When the reversing lever 15 has been turned into the position as shown by the double-dot line in FIG. 3, the projection 18 of the actuator 14 becomes disengaged from the projection 9 of the detection disk 11 and the other projection 19 of the actuator 14 is set into the position where it can engage with the other projection 10 of the detection disk 11. The projection 19 and the push portion of the actuator 14 and the projection 10 of the detection disk 11 are now situated in the same relationship among them as that which existed among the projection 18, the push portion and the projection 9 before the reversing lever 15 has been actuated. The arm 13 now performs the same action as the arm 13 did when the reversing lever 15 was in the position shown by the solid line of FIG. 3; that is, when the tape winding has been completed, the reversing lever 15 is automatically turned into the other position.

While the tape is being rewound, the reel support 3 and the detection disk 11 are rotating counterclockwise, so that the actuator 14 is oscillating about the movable shaft 16 in a predetermined range without the projection 19 of the actuator 14 engaging with the projection 10 of the detection disk 11. When the tape rewinding has been completed, the reel support 3 and the detection disk 11 stop rotating. The projection 19 then engages with the projection 10, and the rotation of the drive gear 20 causes the actuator 14 to move counterclockwise about the engaging point between the projections 19 and 10, thereby displacing the movable shaft 16 to turn the reversing lever 15 about the shaft 1 into the position indicated by the solid line in FIG. 3. This causes the sliding arm 36 to move toward the left-hand side position, releasing the reversing member 42 on the right-hand side and actuating the other reversing member 43 on the left-hand side so that the tape winding gears 34, 35 and the pinch rollers 32, 33 are displaced simultaneously. As a result, the tape feeding direction is reversed.

What is claimed is:

1. A tape feeder in a tape recorder comprising: a pair of reel support drive gears mounted on a pair of reel supports; a pair of tape winding gears capable of being brought into or out of mesh with the corresponding reel support drive gears; a pair of capstans driven by a motor for rotating the corresponding tape winding gears; a pair of pinch rollers connected to a head base plate and capable of being brought into and out of pressing engagement with the corresponding capstans; a pair of reverse action members rotatably supported on the corresponding capstan bearing, said reverse action members having the tape winding gear rotatably supported at one end thereof and having a cam groove formed at the other end thereof, said cam groove being adapted for receiving the shaft of the pinch roller to bring the pinch roller into or out of pressing contact with the capstan; a pair of springs provided to the corresponding reverse action members, said springs being adapted to press the pinch roller against the capstan when the head base plate advances and at the same time urge the tape winding gear to mesh with the reel support drive gear; and a slider member slidably provided between the pair of reverse action members, said slider member being slid, when the tape winding is completed, toward the reverse action member on that side where the tape has been wound so as to push one end of that reverse action member against the force of the spring and at the same time release the other reverse action member.

\* \* \* \* \*